Patented Mar. 19, 1935

1,995,153

UNITED STATES PATENT OFFICE 1,995,153

REMOVAL OF WAX FROM HYDROCARBON OIL

Bernard Y. McCarty, Beacon, N. Y., and William E. Skelton, Cambridge, Mass., assignors to The Texas Company, New York, N. Y., a corporation of Delaware No Drawing. Application November 30, 1931, Serial No. 578,206

6 Claims. (Cl. 196—19)

This invention relates to the removal of wax from hydrocarbons and more particularly to an improved process for the removal of paraffin from lubricating oil fractions derived from petroleum.

The invention contemplates a process of dewaxing wax-containing lubricating oil fractions by filtration at low temperatures, wherein the wax-containing oil is mixed with a wax-precipitating liquid medium composed of a solvent liquid or mixture of solvent liquids which is completely miscible with, and exerts a substantially complete solvent action upon, the oil at the temperatures at which the wax constituents are precipitated from the oil in solid form and which has substantially no solvent action on the solid hydrocarbons at such temperatures. The resulting mixture is then chilled to precipitate the solid hydrocarbons which are removed by filtration.

More specifically the invention contemplates mixing with lubricating oil fractions a wax-precipitating liquid medium composed of a mixture of ortho-dichloro-benzene with either amyl alcohol, diethylene-glycol-mono-butyl ether, methyl ethyl ketone, propylene dichloride or ethylene dichloride. In some instances, ordinary commercial benzene may be used as in the case of mixtures with the ether compound.

An object of this invention is to effect dewaxing of paraffin-containing hydrocarbon oils with an improved type of solvent liquid composed of a mixture of solvents having selective solvent properties between the oil and the wax constituents and which, in addition, retains its selective solvent properties at relatively low temperatures whereby the precipitation of the wax from the mixture, particularly in the case of mixtures with relatively viscous oils, is effected in a more readily filterable form. At the same time, a high yield of dewaxed oil is obtained.

A further object has been to develop a solvent liquid which possessed the foregoing properties at relatively low temperatures and which is, therefore, adaptable for the manufacture of lubricating oils having pour tests of —20° F. and lower.

A selective solvent suitable for the foregoing dewaxing operation, and particularly when composed of two or more organic solvents, must retain its homogeneity and its property of remaining completely miscible with the liquid hydrocarbon constituents of the mineral oil at temperatures substantially well below 0° F. Complete miscibility is necessary in order to prevent separation of such liquid hydrocarbons from the solution. Such separated liquid hydrocarbons materially increase the viscosity of the solution thereby tending to reduce the filtering rate to a point where the operation is not economical. In addition, the presence of this separated liquid gives rise to a condition which is productive upon filtration of a wax cake containing substantial amounts of oil so that the maximum yield of dewaxed oil is not realized.

It is essential that such a solvent mixture remain completely homogeneous at these low temperatures and not exhibit any tendency for any of its components to separate from the mixture. Upon separation of one of the components from the solvent mixture, the ratio of the components remaining in the mixture is altered, thereby changing its selective solvent properties so that the wax constituents will not be completely precipitated and/or appreciable amounts of the liquid hydrocarbon may separate from the solution due to the resulting lack of complete miscibility on the part of the solvent with the oil owing to its altered condition.

Extensive investigation has demonstrated that a solvent liquid or solvent mixture satisfactory for use as a wax-precipitating medium in the dewaxing of wax-containing hydrocarbon oils must possess, among other things, low absolute viscosity and low viscosity temperature coefficient, high oil solubility at low temperatures, low wax solubility at low temperatures, low freezing point, and also possess the property of precipitating wax in a readily filterable condition.

Accordingly after investigating various solvent liquid mixtures, it has been found that a mixture of ortho-dichloro-benzene and amyl alcohol, diethylene-glycol-mono-butyl ether, propylene, or ethylene dichloride, possesses the foregoing combination of properties, thereby rendering it superior to the solvent liquids or liquid mixtures hitherto used in the art and, therefore, particularly well adapted as a wax-precipitating medium for use in the manufacture of low pour test paraffin base lubricating oil. The relative proportion of these liquids to each other, as well as that of the resulting solvent mixture to the oil, may be varied as desired, depending upon the nature of the oil undergoing treatment.

Thus when dewaxing a lubricating distillate fraction, having a viscosity of around 70 to 80 Saybolt universal seconds or higher at 210° F., about thirty parts of the oil may be mixed with about seventy parts of a solvent mixture composed of around 20% ortho-dichloro-benzene and about 80% of commercial grade amyl alcohol. The resulting mixture is then chilled to about —10° F. or to a temperature corresponding substantially to the desired pour test of the resuliting dewaxed oil, following which it is subjected to filtration while still maintained in a cold condition to separate the precpitated wax constituents. Advantageously filtration may be carried out in the presence of a finely divided comminuted filter-aid material which may be added to and commingled with the cold mixture of oil, solvent and suspended wax crystals. After removal of the solvent liquid from the filtrate, the resulting lubricating oil will have a pour test of 0° F. or lower.

Similar results may be obtained, on the other hand, by mixing the oil in about the same proportion with a solvent mixture composed of about 65% ortho-dichloro-benzene and about 35% of either ethylene or propylene dichloride. It is frequently desirable to employ a solvent liquid mixture in which the benzene is at least equal in volume to either the ethylene or propylene dichloride.

While the use of the foregoing solvent liquid mixtures has been described in connection with a lubricating distillate fraction of relatively high viscosity, it is contemplated that mixtures of these solvent liquids may be equally well employed with oils of various viscosity ranges. It is also contemplated that mixtures of these solvent liquids are not necessarily restricted to dewaxing distillate fractions but may also be used in dewaxing various wax-bearing fractions of mineral oil.

Obviously many modifications and variations of the invention, as hereinbefore set forth, may be made without departing from the spirit and scope thereof, and therefore only such limitations should be imposed as are indicated in the appended claims.

We claim:

1. In a process of separating wax from a wax-bearing mineral oil to produce low pour test lubricating oil, the step comprising mixing with the oil a wax-precipitating liquid medium composed of ortho-dichloro-benzene in admixture with a liquid selected from the group consisting of ethylene dichloride and propylene dichloride in such proportions that at temperatures of the order of $-10°$ F. the mixture has substantially complete solvent action on the oil and substantially no solvent action on the wax.

2. In the process of separating wax from a wax-containing lubricating oil fraction, the step comprising mixing with the fraction a wax-precipitating liquid medium composed of ortho-dichlorbenzene and ethylene dichloride in such proportions that at temperatures of the order of $-10°$ F. the mixture has substantially complete solvent action on the oil and substantially no solvent action on the wax.

3. In the process of separating wax from a wax-containing lubricating oil fraction, the step comprising mixing with the fraction a wax-precipitating liquid medium composed of ortho-dichloro-benzene and propylene dichloride, in such proportions that at temperatures of the order of $-10°$ F. the mixture has substantially complete solvent action on the oil and substantially no solvent action on the wax.

4. The process of dewaxing wax-bearing mineral oil comprising mixing with the oil a selective solvent liquid composed of ortho-dichloro-benzene and a liquid selected from the group consisting of ethylene dichloride and propylene dichloride in such proportions that at temperatures of the order of $-10°$ F. the mixture has substantially complete solvent action on the oil but substantially no solvent action on the wax, chilling the mixture to precipitate the wax, separating the wax thus precipitated, and removing the solvent from the dewaxed oil.

5. The process of manufacturing low pour test lubricating oil from wax-bearing lubricating oil fractions by filtration at a temperature substantially the same as the pour test of the desired product, comprising mixing with the wax-bearing fraction a wax-precipitating liquid medium composed of ortho-dichloro-benzene and a liquid selected from the group consisting of ethylene dichloride, and propylene dichloride in such proportions that at temperatures of the order of $-10°$ F. the mixture has substantially complete solvent action on the oil and substantially no solvent action on the wax, chilling the mixture to a temperature corresponding substantially to the pour test of the desired product in order to precipitate the wax constituents, and filtering the mixture while maintained in a cold condition to remove the precipitated wax constituents and produce a desired low pour test lubricating oil product.

6. The process of manufacturing low pour test lubricating oil from wax-bearing lubricating oil fractions by filtration at a temperature substantially the same as the pour test of the desired product, comprising mixing with the wax-bearing fraction a wax-precipitating liquid medium composed of ortho-dichloro-benzene and a liquid selected from the group consisting of ethylene dichloride, and propylene dichloride in such proportions that at temperatures of the order of $-10°$ F. the mixture has substantially complete solvent action on the oil and substantially no solvent action on the wax, chilling the mixture to a temperature corresponding substantially to the pour test of the desired product in order to precipitate the wax constituents, and filtering the mixture in the presence of a filter-aid material while maintained in a cold condition to remove the precipitated wax constituents and produce a desired low pour test lubricating oil product.

BERNARD Y. McCARTY.
WILLIAM E. SKELTON.